United States Patent [19]

Kim et al.

[11] Patent Number: 5,029,679
[45] Date of Patent: Jul. 9, 1991

[54] MANUAL OPERATING DEVICE FOR THE BRAKE AND ACCELERATOR PEDALS OF AN AUTOMOBILE

[76] Inventors: Yo-Sub Kim, 138-3, Bangyi-Dong, Songpa-Ku, Seoul; Young-Soo Kim, 10-21, Hyehwa-Dong, Jongro-Ku, Seoul, both of Rep. of Korea

[21] Appl. No.: 504,789

[22] Filed: Apr. 4, 1990

[51] Int. Cl.⁵ .................. B60K 41/20; G05G 1/21; G05G 9/02
[52] U.S. Cl. .................................. 192/1.52; 74/481; 74/482
[58] Field of Search .................. 192/1.1, 1.36, 1.52; 74/481, 482

[56] References Cited

U.S. PATENT DOCUMENTS

| | | | |
|---|---|---|---|
| 2,602,348 | 7/1952 | Wilson | 192/1.52 X |
| 2,707,886 | 5/1955 | Lerman | 74/481 |
| 2,724,285 | 11/1955 | Lerman | 74/481 |
| 2,731,850 | 1/1956 | Otto et al. | 192/1.52 X |
| 2,777,335 | 1/1957 | Engberg et al. | 74/481 |
| 2,826,089 | 3/1958 | Hammack | 74/481 X |
| 2,855,797 | 10/1958 | Dunn, Jr. | 74/482 X |

FOREIGN PATENT DOCUMENTS 85-592  4/1985  Rep. of Korea .

*Primary Examiner*—Richard Lorence
*Attorney, Agent, or Firm*—Beveridge, DeGrandi & Weilacher

[57] ABSTRACT

This invention relates to a manual operating device for the brake and accelerator pedals of an automobile which enables a driver to operate an automobile safely and conveniently. The present invention comprises a handle lever, a mounting member, a brake pedal operating rod, and an accelerator pedal operating rod. The mounting member includes a supporting member, connecting bolts, a fixing member and a U-bolt. The brake pedal operating rod includes an upper pipe rod, a connecting pipe and a lower rod. The accelerator pedal operating rod includes an upper pipe rod, a connecting pipe and a lower rod.

14 Claims, 5 Drawing Sheets

MANUAL OPERATING DEVICE FOR THE BRAKE AND ACCELERATOR PEDALS OF AN AUTOMOBILE

This invention relates to a manual operating device for the brake and accelerator pedals of an automobile, and in particular, to a manual operating device for the handicapped driver, to enable the handicapped driver to drive an automobile safely and conveniently.

BACKGROUND OF THE INVENTION

In the prior art, there is a manual operating device for the accelerator pedal and brake pedal for the handicapped person, such as Korean Utility Model Publication No. 85-592. In Korean Utility Model Publication No. 85-592, dated Apr. 21, 1985, K.H. Rho et al. describes a type of manual operating device for the accelerator pedal and brake pedal of an automobile. As shown in FIG. 6, K.H. Rho et al. shows that when the driver pulls the handle lever 101, bevel gear 102 and the axle 103 are rotated simultaneously, thereby rotating eccentrical shaft 104 and bevel gear 105, which causes the rod 106 to move downward and press accelerator pedal 107 down, thus the automobile is accelerated. When the driver takes his hand off the handle lever 101, or pushes it to the original position, the axle 103 and accelerator pedal 107 are moved to the original position by the spring 108. When the driver pushes the handle lever 101 downward in order to stop the automobile, the rod 109 and the brake pedal 110 are moved downward, and the automobile is stopped. When the driver takes his hand off the handle lever 101, or pulls it to the original position, the rod 109 and the brake pedal 110 are moved upward to the original position, and the automobile is again able to move.

However, the prior utility model is inconvenient for the handicapped driver to use to operate the brake pedal and the accelerator pedal, because it requires both forward and backward movement and upward and downward movement for accelerating and stopping the automobile. In this conventional device, the complicated mechanical structure increases the cost of production, and creates an enormous economic burden. Furthermore, the efficiency of production is low because of the complicated mechanical structure.

SUMMARY OF THE INVENTION

The goal of the present invention is to remedy these disadvantages by providing a manual operating device which comprises a handle lever and operating rods for the brake pedal and the accelerator pedal which is based on a link mechanism. One objective of the present invention is to provide a simple device employing a handle lever and operating rods in substitution for the conventional, complicated operating device for the accelerator pedal and brake pedal for the handicapped driver.

Another objective of the present invention is to provide a manual operating device which allows very easy operation of the accelerator pedal and brake pedal.

Another objective of the present invention is to provide a manual operating device which has a lowered cost of production and an increased efficiency of production.

To accomplish these objectives, the present invention comprises a handle lever, a mounting member, a brake pedal operating rod and an accelerator pedal operating rod, wherein the mounting member includes a supporting member, connecting bolts, a fixing member and a U-bolt. The brake pedal operating rod includes an upper pipe rod, a connecting pipe and a lower rod. The accelerator pedal operating rod includes an upper pipe rod, a connecting pipe and a lower rod.

BRIEF DESCRIPTION OF THE DRAWINGS

This invention will be described hereinbelow with reference to the attached drawings, wherein.

DETAILED DESCRIPTION OF THE INVENTION

Figure 1:
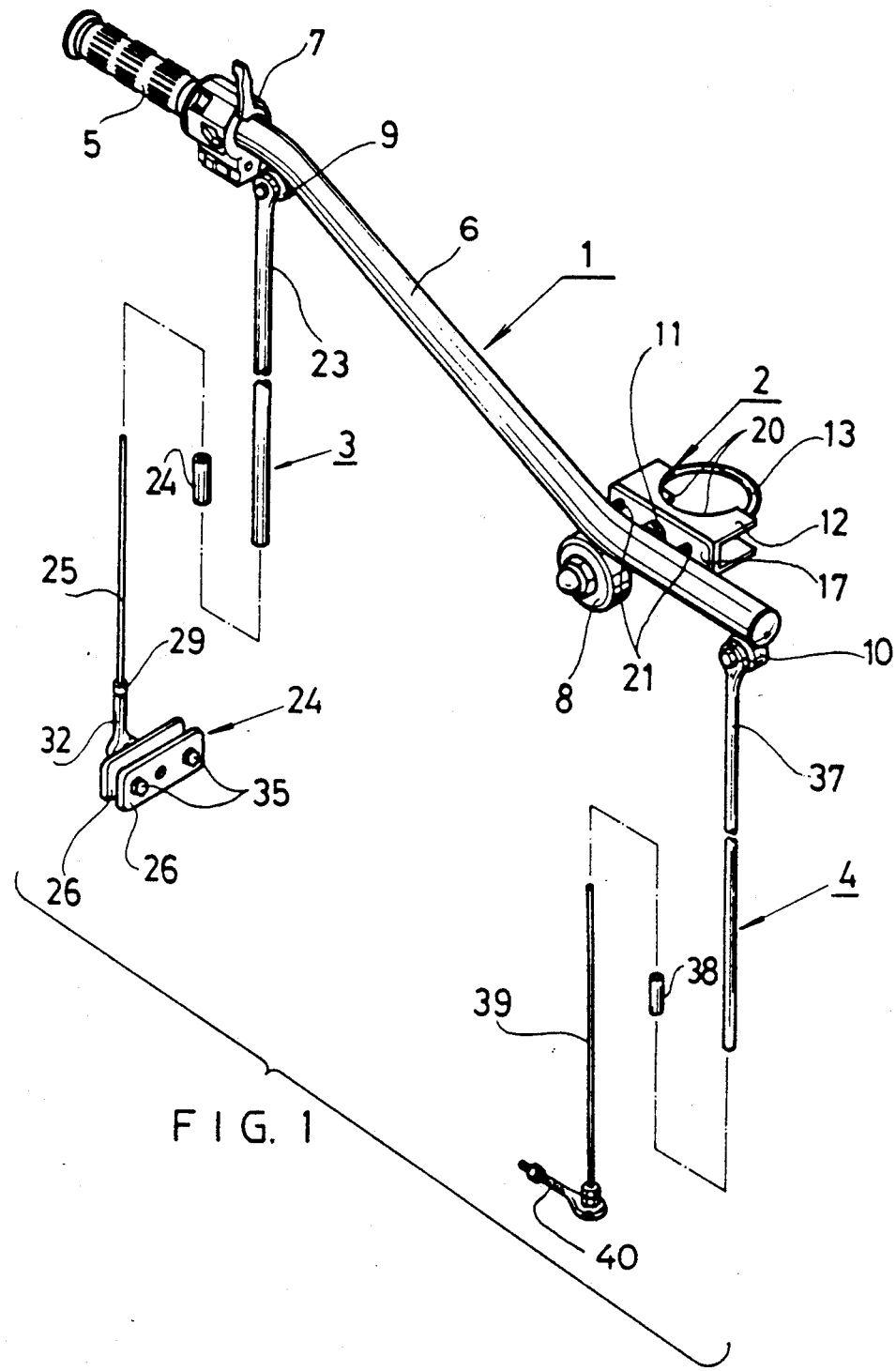
FIG. 1 is an exploded view of the present invention.
Figure 2:
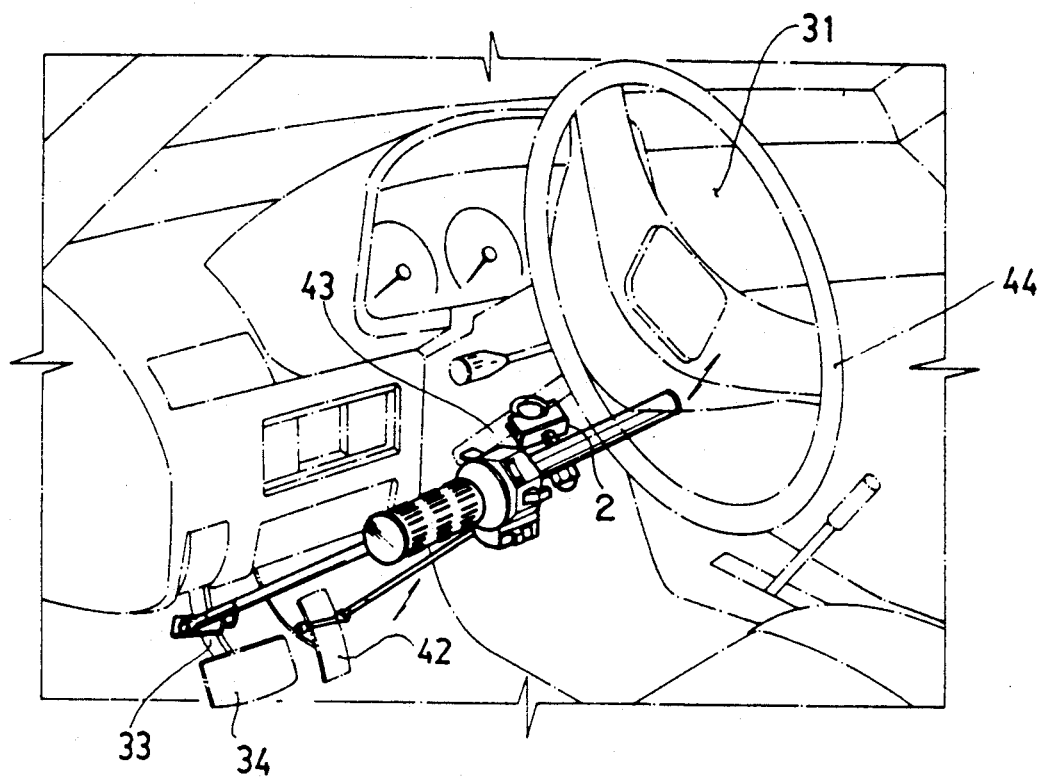
FIG. 2 is a perspective view showing the present invention mounted around the steering axle jacket of an automobile.
Figure 3:
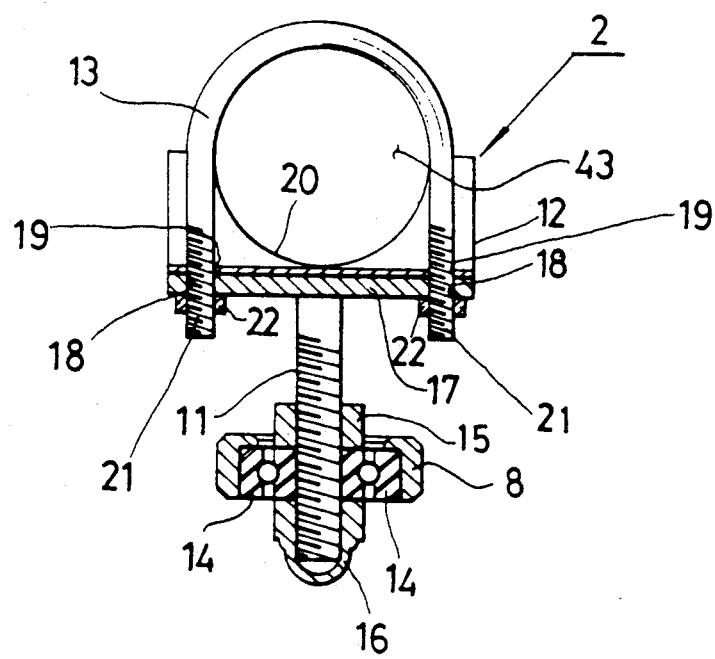
FIG. 3 is a sectional view showing the mounting member of the present invention.

As shown in FIG. 1, FIG. 2 and FIG. 3, the present invention comprises a handle lever 1, a mounting member 2, brake pedal operating rod 3 and accelerator pedal operating rod 4.

Handle lever 1 includes a handle 5 which is inserted and fixed to the left end of the lever 6. The lever 6 is formed into an "S" shape and has a conventional combined switching member 7, and further includes three supporting members 8, 9 and 10 for the mounting member 2, brake pedal operating rod 3 and accelerator pedal operating rod 4, respectively, welded to the underside of the handle lever 1.

Mounting member 2 includes the supporting member 8, connecting bolt 11, fixing member 12 and U bolt 13, wherein the supporting member 8 has a bearing 14 inserted at one end of the connecting bolt 11. The connecting bolt 11 is fixed by lock nut 15 and cap nut 16, and the connecting bolt 11 is welded on the center of vertical plate 17, which includes holes 18, 18. A fixing member 12, with holes 19, 19 and upper and lower semicircular portions 20, 20, is connected to vertical plate 17. A U bolt 13 is formed with threads 21, 21 on its ends, which is inserted through the holes 18 and 19 of said vertical plate 17 and fixing member 12 and fixed thereto by nuts 22, 22.

Brake pedal operating rod 3 includes an upper pipe rod 23 which is joined with said supporting member 9; a connecting pipe 24; and a lower rod 25 which is joined with fixed plates 26, 26. The supporting member 9 is rotatably connected to one end of the upper pipe rod 23 by a ball and socket joint, as shown in FIG. 2. The lower rod 25 is inserted through connecting pipe 24 and into the upper pipe rod 23. The connecting pipe 24 is stopped on the stopper 29, which is welded on the lower rod 25, and one end of the lower rod 25 is rotatably connected to one of the fixed plates 26 by way of a ball and socket joint in supporting member 32. The supporting member 32 is welded to one of the fixed plates 26, which is fixed together with the other plate 26. The fixed plates 26 are fixed to the pedal rod 33 of brake pedal 34 by bolts 35, 35 and nuts 36, 36 (see also FIG. 4 and FIG. 5).

Accelerator pedal operating rod 4 includes an upper pipe rod 37, which is joined with the supporting member 10; a connecting pipe 38; and a lower rod 39 which is joined with fixed pin 40. The supporting member 10 is rotatably connected by way of a ball and socket joint to one end of said upper pipe rod 37 as aforementioned. The lower rod 39 is inserted through connecting pipe 38 and into said upper pipe rod 37. The connecting pipe 38 is stopped on one end of lower rod 39, and the lower rod 39 is connected by way of a ball and socket joint with fixed pin 40. The fixed pin 40 is fixed by welding to the underside of the accelerator pedal 42.

Reference numerals 43 and 44 in FIG. 2 represent the steering axle jacket and the steering handle respectively.

Next, the operation and effect of the present invention, a manual operating device for the accelerator and brake pedals of an automobile, will be described concisely with reference to the mounting state shown in FIG. 2 and the operating states shown in FIG. 4 and FIG. 5.

FIG. 2 shows the state of the present invention as mounted around the steering axle jacket 43 in an automobile by mounting member 2. The present invention is installed in an automobile by following this sequence of steps:

First, the pedal rod 33 of brake pedal 34 is fixed between the fixed plates 26 of lower rod 25 by bolts 35, 35 and nuts 36, 36. The underside of the accelerator pedal 42 is fixed by welding the pin 40 of lower rod 39 to the accelerator pedal 42.

Second, the lower rods 25, 39 are inserted through the connecting pipes 24, 38 respectively, and into the upper pipe rods 23, 37 respectively.

Third, U-bolt 13 is placed around the steering axle jacket 43 and assembled together with upper and lower semicircular portions 20, 20 at the proper position on the steering axle jacket 43. The U-bolt 13 is inserted through the holes 19, 18 of the fixing member 12 and vertical plate 17 and fixed tightly by nuts 22, 22.

Figure 4:
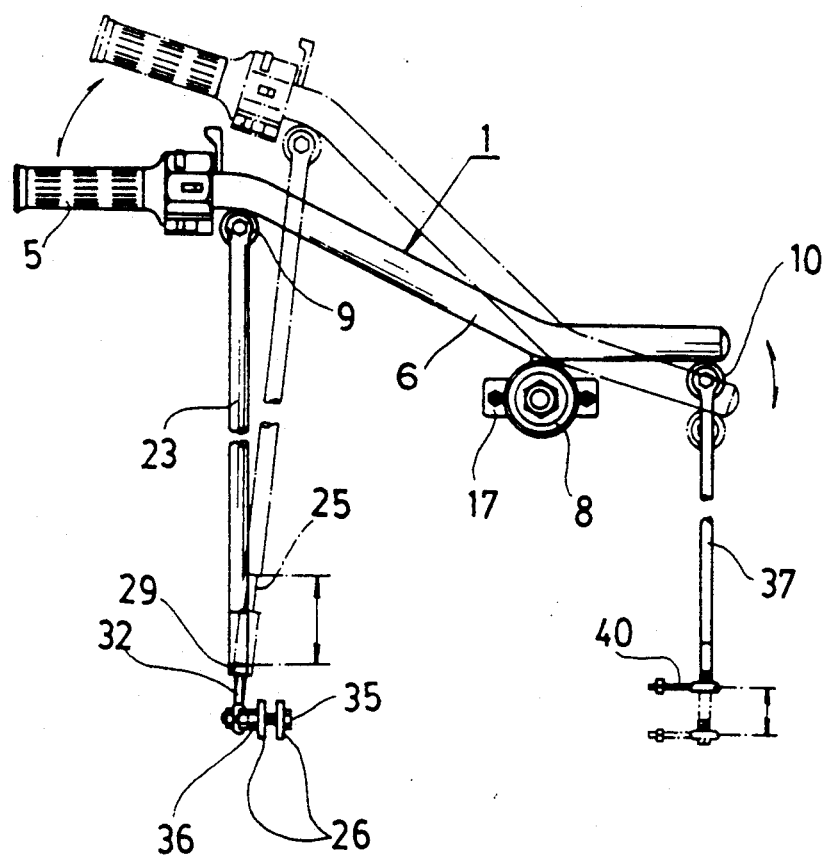
FIG. 4 is a view showing the operating state of the invention when brake pedal is pressed downward, FIG. 5 a view showing the operating state of the invention when the accelerator pedal is pressed downward.

FIG. 4 shows the operating state of the present invention when the brake pedal 34 is moved from upward to downward, thereby slowing and stopping the automobile.

When the driver pulls the handle 5 downward, the left side of the lever 6 is moved down together with the upper rod 23, as the handle lever 1 is rotated about the center axis of bearing 14 of supporting member 8. This action simultaneously presses the connecting pipe 24, lower rod 25 and brake pedal 34, downward, and the automobile is stopped. Conversely, when the driver pushes the handle 5 upward, the left side of the lever 6 and the upper rod 23 are moved upward, and also the connecting pipe 24, lower rod 25 are moved upward by the restitution force of the brake pedal 34, and the automobile may again move. At this time, the connecting pipe 24 is able to protect the stopper 29 from contacting with the upper rod 23, and thereby preventing noise.

Figure 5:
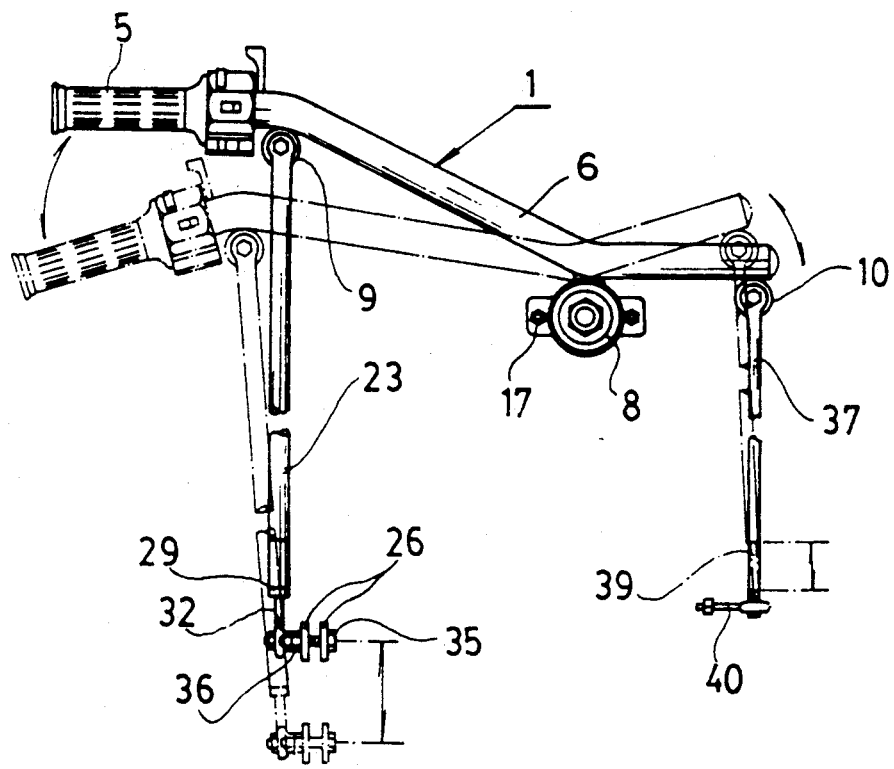
Figure 6:
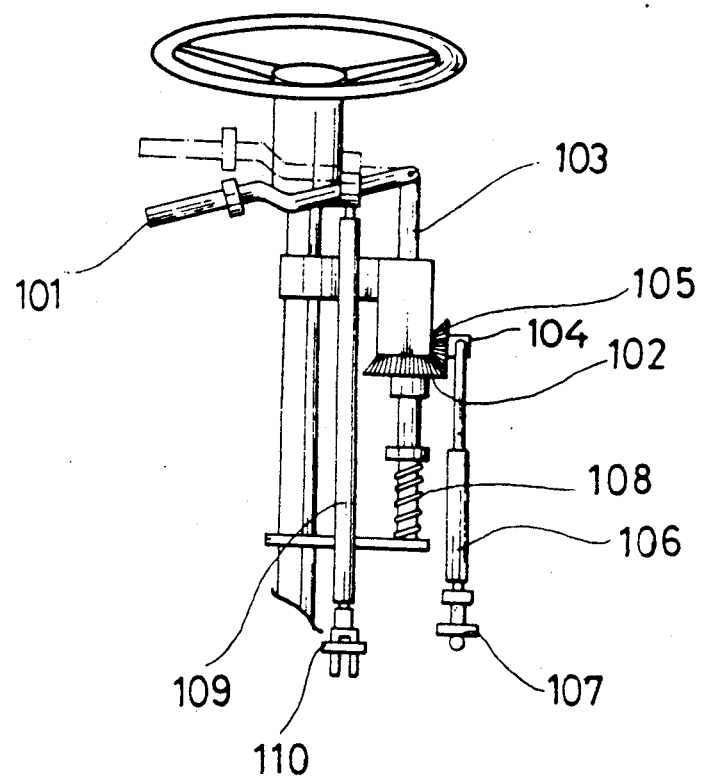
FIG. 6 is a schematic view showing the prior art utility model discussed earlier in this specification.

FIG. 5 shows the operating state of the present invention when the accelerator pedal 42 is moved from upward to downward, thereby accelerating the automobile. When the driver pushes the handle 5 upward, the right side of the lever 6 is moved down, together with the upper rod 37, as the handle lever 1 is rotated about the center axis of bearing 14 of the supporting member 8. This action simultaneously presses the connecting pipe 38, lower rod 39 and accelerator pedal 42 downward, and the automobile is accelerated. Conversely, when the driver pulls the handle 5 downward, the right side of the lever 6 and the upper rod 37 are moved upward, and also the connecting pipe 38 and lower rod 39 are moved upward by the restitution force of the accelerator pedal 42, and the automobile is decelerated.

As mentioned above, the automobile is completely controlled by operating the handle lever 1 of the present invention, and consequently, the automobile may be stopped and started, or the automobile speed may be increased or decreased.

Therefore, the present invention comprises a handle lever 1, mounting member 2, brake pedal operating rod 3 and accelerator pedal operating rod 4, so the device enables one to easily operate the brake pedal 34 and the accelerator pedal 42 of an automobile. The simple mechanical structure of the handle lever 1 decreases the cost of production and increases the productivity of the production.

Numerous characteristics and advantages of the invention are described in this document and have been set forth in the foregoing description. It is understood, however, that this disclosure is, in many respects, only illustrative. Changes may be made in details, particularly in matters relating to the shape, size, and arrangement of parts, without departing from the scope of the invention. The scope of the invention is, of course, defined in the language of the appended claims.

What is claimed is:

1. A manual operating device for the brake and accelerator pedals of an automobile, comprising:

a handle lever including a first end and a second end;

a mounting member connected to said handle lever between the first end and the second end, for connecting said device to a steering column of the automobile;

a brake pedal operating rod connected to said first end of the handle lever, wherein said brake pedal operating rod includes a brake pedal upper pipe rod connected to said first end of said handle lever, a brake pedal connecting pipe, and a brake pedal lower rod slidably inserted through said brake pedal connecting pipe and into said brake pedal upper pipe rod;

an accelerator pedal operating rod connected to said second end of the handle lever, wherein said accelerator pedal operating rod includes an accelerator pedal upper pipe rod connected to said second end of said handle lever, an accelerator pedal connecting pipe, and an accelerator pedal lower rod slidably inserted through said accelerator pedal connecting pipe and into said accelerator pedal upper pipe rod, whereby pivoting of said handle lever about said mounting member applies pressure to said brake pedal or to said accelerator pedal.

2. The manual operating device as defined in claim 1, further comprising a handle fixed to said first end of said handle lever for gripping by the operator of the device.

3. The manual operating device as defined in claim 1, wherein said handle lever is formed into an "S" shape.

4. The manual operating device as defined in claim 3, wherein said handle lever further includes a brake pedal operating rod support member for connecting said brake pedal operating rod to said handle lever, an accelerator pedal operating rod support member for connecting said accelerator pedal operating rod to said handle member, and a mounting member support member for connecting said mounting member to said handle lever.

5. The manual operating device as defined in claim 4, wherein said brake pedal operating rod support member, said accelerator pedal operating rod support member, and said mounting member support member are welded to said handle lever.

6. The manual operating device as defined in claim 1, wherein said handle lever further includes a mounting member support member for connecting said mounting member to said handle lever, wherein the mounting member support member includes a bearing;

said mounting member being fixed to said mounting member support member by a connecting bolt, a lock nut, and a cap nut, wherein said connecting bolt is welded to a plate with holes defined therein, wherein said mounting member further includes a fixing member and a U-bolt for attaching said device to said steering column;

wherein said fixing member of said mounting member has holes defined therein, and said fixing member including at least one semicircular portion, wherein said U-bolt fits through said holes in said fixing member and said plate, and is connected to said fixing member and said plate by nuts.

7. The manual operating device as defined in claim 1, wherein said handle lever further includes a brake pedal operating rod support member rotatably connected to said brake pedal operating rod at said first end of said handle lever;

a brake pedal operating rod stopper fixed to said brake pedal lower rod;

wherein an end of said brake pedal lower rod is rotatably connected to a means for connecting said brake pedal operating rod to an automobile brake.

8. The manual operating device as defined in claim 7, wherein said brake pedal operating rod support member is rotatably connected to said brake pedal operating rod by a ball and socket joint; wherein said brake pedal operating rod stopper is fixed to said brake pedal lower rod by welding; and said brake pedal lower rod is rotatably connected to said means for connecting by another ball and socket joint.

9. The manual operating device as defined in claim 7, wherein said means for connecting includes two plates connected by at least one nut and bolt, such that the automobile brake is placed between the two plates.

10. The manual operating device as defined in claim 1, wherein said handle lever further includes an accelerator pedal operating rod support member rotatably connected to said accelerator pedal operating rod at said second end of said handle lever;

wherein an end of said accelerator pedal lower rod is rotatably connected to a means for connecting said accelerator pedal operating rod to a pin.

11. The manual operating device as defined in claim 10, wherein said accelerator pedal operating rod support member is rotatably connected to said accelerator pedal operating rod by a ball and socket joint; and said accelerator pedal lower rod is rotatably connected to said means for connecting by another ball and socket joint.

12. The manual operating device as defined in claim 10, wherein said pin is fixed to an underside of an automobile accelerator pedal.

13. The manual operating device as defined in claim 12, wherein said pin is fixed to said accelerator pedal by welding said pin to the underside of an automobile accelerator pedal.

14. The manual operating device as defined in claim 1, wherein said mounting member includes a fixing member and a U-bolt for attaching said operating device to said steering column.

* * * * *